United States Patent [19]

Nakada et al.

[11] 4,251,415

[45] Feb. 17, 1981

[54] PAINT COMPOSITION FOR CATIONIC ELECTRODEPOSITION PROCESS

[75] Inventors: Hisao Nakada; Michisuke Harada; Seiji Yoshikoshi, all of Ichihara, Japan

[73] Assignee: Nippon Soda Company Limited, Ohtemachi, Japan

[21] Appl. No.: 50,751

[22] Filed: Jun. 21, 1979

[30] Foreign Application Priority Data

Jun. 27, 1978 [JP] Japan .................................. 53-77781

[51] Int. Cl.$^3$ ........................ C08L 63/00; C08L 13/02
[52] U.S. Cl. .................... 260/29.7 NR; 260/29.2 EP; 525/111; 525/119; 525/122; 525/911
[58] Field of Search ............... 525/111, 119, 122, 911; 260/29.2 EP, 29.7 NR

[56] References Cited

U.S. PATENT DOCUMENTS

| | | | |
|---|---|---|---|
| 3,686,359 | 8/1972 | Soldatos | 525/122 |
| 3,707,583 | 12/1972 | McKown | 525/119 |
| 3,823,107 | 7/1974 | Cotton | 525/119 |
| 3,894,113 | 7/1975 | Pagel | 525/122 |
| 3,926,903 | 12/1975 | Scola | 525/119 |
| 3,926,904 | 12/1975 | Scola | 525/119 |
| 4,107,116 | 8/1978 | Riew | 525/122 |
| 4,130,546 | 12/1978 | Goto | 525/111 |

FOREIGN PATENT DOCUMENTS 514879  6/1976  U.S.S.R. .................................. 525/111

Primary Examiner—Paul Lieberman
Attorney, Agent, or Firm—George B. Oujevolk

[57] ABSTRACT

A paint composition for cationic electrodeposition process comprises a producing step in which a polymer of conjugated diene having carboxyl group at molecular terminal position or a copolymer of the said conjugated diene and vinyl monomer is made to react with an epoxy resin by a type of condensate of bisphenol A - epichlorohydrin and further, the resulting reaction compound is made to react with a primary amine compound or a secondary amine compound and thereby a reaction compound (component 1) is obtained and furthermore, the said reaction compound (component 1) is made to react with a partial block isocyanate compound (component 2) and this final reaction compound is used for an ingredient of the paint composition as a film forming material.

1 Claim, No Drawings

PAINT COMPOSITION FOR CATIONIC ELECTRODEPOSITION PROCESS

DETAILED EXPLANATION(S) FOR THE INVENTION

The present invention relates to an aqueous soluble or aqueous dispersible paint composition. More particularly, it relates to the paint composition which comprises performing suitably an electrodeposition coating procedure by using an objective coating product as a cathode.

In recent years, the electrodeposition coating process as an industrial coating method and coating materials and coating methods used in this industrial field are extremely multifarious.

As the main electrodeposition coating resins used hitherto, a resin having carboxyl group, for example, a maleated oil a maleated polybutadiene, maleated epoxy ester and alkyd resin or an acrylic resin containing acrylir acid or methacrylic as a copolymer ingredient are mentioned.

The foregoing resins are neutralized with a base involving amonia, organic amine or caustic potash and thereby aqueous solubility is created in these resins and thus an electrodeposition coating method by anodic sedimentation is devised, which comprises using a product to be coated as an anode. But, when electrodeposition coating by anodic sedimentation is carried out, and the product to be coated is used as an anode, oxygen is generated with aqueous electrolysis and the metal product to be coated is oxidized and one part of the oxidized metal product dissolves in water.

Usually, the metal product to be coated is first treated with a phosphate salt or the like for the sake of improving anticorrosive properties, and when this is done the aforementioned phenomenon similarly occurs. Consequently according to the electrodeposition coating method by anodic sedimentation, the anticorrosive property which is regarded as the most important property of the coated film is greatly deteriorated.

On the other hand, when there is electrodeposition by cathodic sedimentation, the product to be coated is used as a cathode so that the dissolution of the metal from the metal product to be coated or the dissolution from the preliminarily treated layer can be prevented or greatly reduced. In other words electrodeposition by cathodic sedimentation eliminates to a large extent the foregoing drawbacks which occur in the electrodeposition coating method by anodic sedimentation.

From the foregoing viewpoint, as a resin for the cationic form of electrodeposition coating process, various proposals have been hitherto revealed. For example, it is well known that a film obtained from an expoxy resin compound, e.g. an epoxy resin by a type of bisphenol A-epichlorohydrin has a superior anticorrosive property and a high adhesiveness and further by means of denaturing these expoxy resins with a primary amine or a secondary amine and adding a block isocyanate compound for the sake of feeding curing nature and then neutralizing it acidically and thereby feeding an aqueous solubility to it, the said epoxy resins can be used as a cationic type of electrodeposition coating material.

But, in respect to a smooth dispersibility of pigment on a coated surface or a long periodic stability in a bath, in other words, the important features of the electrodeposition paint material, these prior techniques have various drawbacks.

On the other hand, according to Japanese Patent Application No. Tokkaisho 92323/1975, an electrodeposition paint material by cathodic sediment type which comprises using an addition reaction compound of polycarboxyl compound-novolak type of epoxy resin as a main resin component is disclosed, but the said paint material can not be said to have a satisfactory level of curing property and anticorrosive nature and further, any disclosure for a curing accelerating means which comprises introducing an active catalyst and a block isocyanate element in paint material is not property described.

A main object for the present invention is to eliminate the foregoing various drawbacks which occur in the cationic type of electrodeposition coating composition produced with the conventional processes or the prior technique and to provide a novel cationic type of electrodeposition coating composition which possesses a superior coating practical property as a physical film involving a smooth coated surface, film curing effect, film flexibility, adhesiveness, chemical film nature involving anticorrosive properties and anti-alkalinity, pigment dispersibility, and long periodical stability in bath and throwing power.

In the other words, the present invention relates to a cationic type of electrodeposition coating composition produced with a process in which a polymer of conjugated diene having carboxyl group(s) at a molecular terminal position and a number average molecular weight of 300 to 10,000 or a copolymer of the said conjugated diene and vinyl monomer (hereinafter, it is abbreviated as a carboxyl terminated diene polymer) is made to react with an epoxy resin by a condensate of bisphenol A-epichlorohydrin and the resulting reaction compound produced is made to react with a] primary or secondary amine compound and further, the resulting reaction compound (Component I) produced is made to react with a partial block isocyanate compound (Component II) and the resulting final reaction compound is used as a film forming material and advantageously, a curing accelerator (Component III) is added in it.

The primary feature for the present invention is to easily obtain a film having smoothness and practically employable thickness in comparison with the film produced by a conventional cationic type of electrodeposition coating composition which is produced by introducing additionally the carboxyl terminated diene polymer into the epoxy resin, i.e. a main component of conventional technique as a main consituting element of the paint composition and by using further the block isocyanate compound in the combination with the main component of the epoxy resin and to improve the pigment dispersibility and the long periodical bath stability.

The second feature for the present invention is to improve a curing effect of the coated film which is the more superior in comparison with a conventional cross-linked and cured type of coated film by components of epxoy resin-block isocyanate.

According to the conventional technical conception, an oxidative, curing reaction of a compound containing an unsaturated bond, e.g. natural drying oil, butadiene polymer or pentadiene polymer causes an oxidation hindering phenomenon with an amino group under a co-existing condition containing an element of amino group as revealed in the present invention. Consequently, it has been a common sense that the said oxidative during reaction has been regarded as a practically impossible level with above mentioned hindering phenomenon. According to the present invention, above oxidative curing reaction can be raised to the common level by using selectively a special catalyst(s).

Further, it is cited out as a conspicuous feature that a chemical film property involving anticorrosive effect, anti-acidity and anti-alkalinity or a physical film property involving flexibility and adhesiveness may indicate superior effects practically.

The carboxyl terminated diene polymer, i.e. an important constituent in the paint composition by the present invention acts as an important role to raise the film curing effect with an origin of its unsaturated group and to improve the pigment dispersibility or the long periodical bath stability. Further, the said carboxyl terminated diene polymer is effected with the epoxy resin by condensate of bisphenol A-epichlorohydrin, i.e. another important component in the present invention as a combining element and thereby has as an important, effective role to raise its physical property involving film flexibility and its adhesiveness and a chemical property involving anticorrosive effect and anti-alkalinity.

The process for practically producing the said carboxyl terminated diene polymer by using the said component I as a raw material is carried out in such a manner that a monomer of a conjugated diolefine or a mixture of the conjugated diolefine monomer and other copolymerizable monomers is polymerized or copolmerized at a low temperature with a living anion polymerization step in tertrahydrofuran solvent by using a polycyclic aromatic compound such as naphthalene as an activator in the presence of a sodium dispersion material as a catalyst and then, the resulting polymerized or copolymerized material as an intermediate compound is treated with carbon dioxide. The foregoing mentioned process is cited as a method for producing a lower molecular polymer or coporymer having a carboxyl group at the molecular end.

According to above mentioned process (i.e. the disclosures of Japanese Patent Nos. Tokkosho 17485/1967, 27432/1968, 33274/1974 and 19687/1974), a favourable objective material having a superior adjustability or molecular weight and carboxyl functional group(s) at the molecular end can be easily manufactured.

Further, in order to attain the satisfactory purpose of the invention, the said carboxyl terminated diene polymer has appropriately a number average molecular weight of 300 to 10,000 and an iodine number of 50 to 500 as an unsaturation degree and then, it contains 1.0 to 2.0 of terminal carboxyl groups, more desirably 1.5 to 2.0 of terminal carboxyl groups, in proportion to one molecule and thus it may have a functional effect.

The said carboxyl terminated diene polymer, if it has less than 300 of number average molecular weight, does not achieve a sufficient level of various properties needed in the finally coated film. If it has more than 10,000 of number average molecular weight, its viscosity in the course of the resin producing reaction step is greatly raised or the danger of gelling phenomenon occurs increasingly.

Further, if the said unsaturation degree is kept in a low extent, the effects proposed by the present invention which comprise an improvement of the coated film curing nature, pigment dispersibility and bath stability can not be achieved sufficiently. Furthermore, if the functional nature by its terminal carboxyl groups is kept in a low extent, a bonding reaction of the carboxyl terminated diene polymer with the epoxy resin can not be sufficiently carried out and then, if the said functional nature is kept to high extent, the danger of the gelling phenomenon occurs increasingly in the foregoing bonding reaction.

Moreover, a saturated or unsaturated, lower molecular polybasic acid compound(s) which comprises phthalic acid, maleic acid, adipic acid, fumaric acid or its dimer acids may be used as an ingredent or its mixture, unless it hinders the object of the present invention.

The epoxy resin by a type of condensate of bisphenol A-epichlorohydrin, i.e other important constituent of the present invention is represented by the following structural formula:

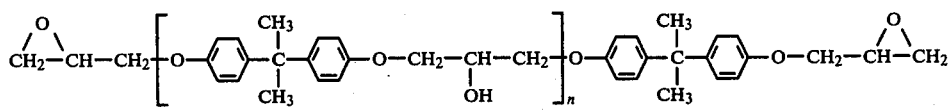

wherein n is an integer ranging from zero to 9, desirably n is zero or an integer of 1 and the said epoxy resin having a somewhat lower molecular weight is suitably used. Those epoxy resins can be produced with a conventional method which comprises making the bisphenol A to react with the epichlorohydrin in the presence of an alkali catalyst.

Moreover, the epoxy resin which is produced with reactants of hydrogenated bisphenol A-epichlorohydrin or reactants of bisphenol A-$\beta$-methyl epichlorohydrin may be used.

Besides the acid epoxy resin by the condensate of bisphenol A-epichlorohydrin, a polyglycidyl ether as a reaction compound of epichlorohydrin with a polyhydric alcohol such as ethylene glycol or glycerine or another polyglycidyl ether as a reaction compound of epichlorohydrin with a polybasic acid such as adipic acid or its dimer acid or a polyepoxide compound obtained by epoxidizing an alicyclic olefine or polybutadiene can be used in so far as it may not hinder the object of the present invention.

An addition reaction for the carboxyl terminated diene polymer (hereinafter, this is called raw material [A]) with the epoxy resin by condensate type of bisphenol A-epichlorohydrin (hereinafter, this is called raw material[B]) is carried out in such manner that the raw material [A] is blended with the raw material [B] containing the epoxy group by an amount of one equivalent part or more in proportion to the carboxyl group of the raw material [A] and the resulting mixture is treated with a heating step at a temperature of 80° C. to 200° C. in the presence of a diluent solvent for avoiding the extraordinary rise of its viscosity or occurrence of the gelling phenomenon in the reaction time or in the absence of the said diluent solvent and the said heating step is continued until the carboxyl group may be substantially eliminated. In this occasion, a catalyst may be added in the above reaction system. As above diluent solvent, an aqueous soluble solvent having a high boiling point which is chemically inactive to both raw materials [A] and [B] may be used. For example, ethyleneglycol monoethylether acetate (hereinafter, this is called cellosolve acetate), cyclohexanone or ethyleneglycol-monobutyl-ether (hereinafter, this is called butyl cellosolve) may be cited. Its appropriate using amount is chosen as a rate of 50 weight percent or less in proportion to a total resin amount of both raw materials [A] and [B].

Further, as above employable catalysts, an oleo-soluble metal salt(s) or tertiary amine(s) are desirably used and its appropriate using amount is selected in a range of 0.01 to 2.0 weight percent in proportion to the total resin components.

The addition reaction compound of the raw material [A] and the raw material [B] obtained above is treated with a heating step at a temperature of 50° C. to 150° C., desirably at a temperature of 80° C. to 120° C. by using the primary or secondary amine compound(s), e.g. propyl amine, butylamine, diethylamine, dipropylamine, mono ethanol amine, diethanol amine, ethylenediamine, diethylenetriamine or these mixture(s) by an amount of 1.0 equivalent or less in proportion to the residual epoxy group in the said reaction compound and thereby an amino compound of the adduct of the carboxyl terminated diene polymer-the epoxy resin (component I) obtained.

An amine value for the said amino compound (Component I) shall be controlled to an extent that it may not hinder aqueous solubility, aqueous dispersibility and the cataphoresis effect of the paint composition by the present invention for the cationic electrodeposition coating process. An appropriate amine value is selected in a range of 20 to 200 KOH mg/pure component gram, desirably in a range of 30 to 100 KOH/mg pure component gram.

As the partial block isocyanate compound (Component II) used for an additive to the component I by the present invention, a partial block isocyanate compound treated with a molar ratio of active hydrogen/NCO in a range of 1.0/2.0 to 2.0/2.0 is appropriately used.

A polyisocyanate employable for the raw material is chosen from an aromatic or aliphatic isocyanates involving m- or p-phenylene diisocyanate, 4.4'-diphenyl methane-diisocyanate, 2.4- or 2.6-tolylene diisocyanate and hexamethylene-diisocyanate or an adduct of the said aromatic or aliphatic isocyanate(s) and polyol (e.g. ethyleneglycol, propyleneglycol or trimethylol propane). As a blocking agent to the polyisocyanate, a lower molecular, active hydride compound is used and for example, an aliphatic or aromatic alcohol involving methanol, ethanol, butanol, hexanol, cyclohexanol, benzylalcohol, butyl cellosolve and cellosolve, an acryl derivatives having unsaturated group involving hydroxy ethyl methacrylate and acrylamide, a hydroxytertiary amine such as N,N-dimethyl amino-ethanol, or phenol, cresol and ε-caprolactam are cited out.

Those block isocyanate compounds are selected from a compound having a peculiar chemical features, i.e., a compound which has a compatible solubility and a thermal dissociating properties as typical features to the indispensable component (Component I) of the resin composition of present invention. Out of these compounds, polyisocyanates comprising 2,4-or 2,6-tolylene diisocyanate and hexamethylene-diisocyanate are desirably exemplified. Further, as the blocking agent, an aliphatic mono alcohol involving butanol and hexanol, an acryl compound having active hydrogen such as hydroxy ethylmethacrylate and ε-caprolactam are desirably exemplified.

The said block isocyanate compound is obtained with a process which comprises making the polyisocyanate to react with a blocking agent containing less than one equivalent of active hydrogen in proportion to the amount of isocyanate group of the polyisocyanate.

The reaction is an exothermic reaction so that the said reaction is performed in the presence of a solvent desirably inactive to the isocyanate group, for example alkyl acetate such as cellosolve acetate, cyclohexanone or diethylketone by dropping the blocking agent in the polyisocyanate component at a temperature of 80° C. or less.

The curing accelerating catalyst employable as the component III for the present invention comprises a catalyst of accelerating urethane bonding reaction and another catalyst for accelerating an oxidizing and curing effect to the unsaturated group in the carboxyl terminated diene polymer.

As an example of the former catalyst, tin compounds involving tin acetate and tin dibutyl-dilaurate are typical and the proper amount to be used is 3 weight percent or less in proportion to the total resin component.

As an example of the latter catalyst, oleo-soluble metal salts of organic acids, various metal acetate salts and various metal phosphate salts are cited and of the aforementioned catalysts, naphthenate salts and octonoic acid salts of transition metals involving iron, manganese, vanadium and titanium or mixtures thereof are particularly effective and the appropriate amount to be used is chosen in a range of 0.005 to 2.0 weight percent, desirably in a range of 0.01 to 1.0 weight percent in proportion to the total resin component.

By using those catalysts, a favourable film curing effect can be obtained, even if the amino group is present simultaneously to impede the oxidative curing set of the unsaturated group. In practice, the object of the present invention can be satisfactorily attained by using the catalyst of accelerating the oxidative curing set alone, but it is more desirable to use the foregoing catalyst together with another catalyst for accelerating the urethane bonding reaction.

In practice, first, the active hydroxyl group(s) in component (I) is made to react with the active isocyanate group(s) in component (II) with an addition reaction step and second, the component (III) is mixed with the resulting reaction compound and, the resin composition by the present invention is obtained.

Above addition reaction of component (I) and component (II) is carried out at a temperature of 50° C. to 100° C. and the resulting addition reaction compound is mixed with the component (III) by a simple physical mixing step and thereby, the foregoing object can be attained.

The ratio of component (I) and component (II) is selected as 99 to 50 weight percent of the component (I) to 1 to 50 weight percent of the component (II). Further, a mixing ratio of the component (III) is desirably selected as 5 weight percent or less.

The resin composition by the present invention obtained is then neutralized and aqueously solubilized with organic or inorganic acid(s), if necessary in the presence of an aqueous soluble, organic solvent and further an organic or inorganic pigment(s) is blended and dispersed in it and thereby the cationic electrodeposition paint composition is obtained.

In the event of performing the neutralizing and aqueous-solubilizing steps, an aqueous soluble organic solvent(s) is desirably used for the purpose of raising the aqueous dispersibility and improving the film properties. As the aqueous soluble organic solvent(s), for example, isopropanol, tert-butanol, cellosolve, butylcellosolve, cellosolve acetate, methyl ethyl ketone or diacetone alcohol alone or these mixtures are desirably used.

The amount to be used is selected as a total rate of 50 weight percent of less in proportion to the resin pure component.

As the acid(s) employable for the neutralizing step, an organic or inorganic acid involving formic acid, acetic acid, hydroxy-acetic acid, propionic acid, butylic acid, lactic acid or phosphonic acid, sulfuric acid and hydrochloric acid may be used.

The amount used shall be in the excess to the amount necessary for solubilizing or dispersing aqueously the said resin at least and futher, the said amount is desirably chosen as one equivalent part or less of the amino group in the resin composition.

The resin composition by the present invention may be used as a clear paint material but usually, it is used by enameling it with the addition of pigment. As pigment(s), common kinds of pigment used for electrodeposition coating process may be cited, but the pigment which has reactivity with the acid(s) by acting as a neutralizing agent is not suitably used. A coloring pigment and an extender pigment, by an optional amount, comprising red oxide, titanium white (titanium dioxide), carbon black, chalk and clay or the like can be used and its the common amount used is desirably selected as an extent of one equivalent part or less in proportion to the resin component.

In so far as it may not hinder the object of the present invention. a cationic or nonionic, aqueous soluble or aqueous dispersible resin, as a vehicle may be added in the paint composition.

As a practical example of above mentioned resins, a methylol-phenol resin, a methylol-melamine resin and an acryl polymer containing amino group such as polyacrylamide are cited.

The present invention is explained by referring to the following examples, but the present invention is not limited by those Examples.

Further, "part" and "percent" in the Examples mean respectively part by weight and percentage by weight.

EXAMPLE 1

A sodium dispersed material was added in tetrahydrofuran containing dissolved 1,2-diphenylbenzene and butadiene was added in the resulting dispersion system at −60° C. of temperature and a reaction solution of living polymer produced thereto was treated with carbon dioxide.

Thus, butadiene lower molecular polymer (Trade Name: NICCO-PBC-1000, product of Nippon Soda Co., Ltd.) having carboxyl group at its molecular end, 1,450 of number average molecular weight (hereinafter, it is abbreviated as molecular weight alone), a micro structure consisting of 90.5 percent of 1.2-vinyl bond and 9.5 percent of 1.4-trans abond and 60 of acid value (the acid value is or will be hereinafter denoted by KOH mg/pure component gram) was obtained.

600 parts of the carboxyl terminated polybutadiene (NISSO-PBC-1000) and 400 parts of epoxy resin by condensate of bisphenol A-epichlorhydrin, i.e. Epikote-828 (Trade Name of Shell Chemical Co.) (hereinafter, this is called as epoxy resin alone) were heated at 150° C. of temperature during 3 hours in nitrogen atmosphere and thus, an addition reaction product of the butadiene lower molecular polymer-the epoxy resin having 2.3 percent of content rate of residual epoxy oxygen and an acid value of 5 or less was obtained.

Then, 1,000 parts of the said addition reaction product kept at 80° of temperature was dissolved in 275 parts of cellosolve acetate and a mixture consisting of 83 parts of diethylamine and 17 parts of ethylene diamine was dropped in above resulting solution during 30 minutes and its reaction was performed at 100° C. of temperature during 2 hours and thus, an amination reaction product (1-A) was obtained.

On the other hand, 87 parts of n-butanol was gradually dropped in a liquid mixture consisting of 188 parts of tolylene diisocyanate (i.e. a mixture of 80 percent of 2,4-TDI and 20 percent of 2,6-TDI) and 69 parts of butyl acetate ester at 60° C. of temperature and further it was continuously kept at 60° C. during one hour, and thus a partial block isocyanate (1-B) was obtained.

Then, 344 parts of the partial block isocyanate (1-B) were added in 1375 parts of the said amination reaction product (1-A) and the resulting mixture was thermally treated at 80° C. of temperature during 1.5 hours and further, it was diluted to 70 of NV whereby the resin composition by the present invention (R-1) having 60 of amine value was obtained (The said amine value is or will be hereinafter denoted by KOH mg/pure conent gram.)

EXAMPLE 2

A solution which consists of 400 parts of the carboxyl terminated polybutadiene (PBC-1000) i.e. the same butadiene polymer used in Example 1, 600 parts of the epoxy resin, i.e. Epikote-834 (Trade Name for the product of Shell Chemical Co.) and 250 parts of cellosolve acetate was thermally treated at 140° C. of temperature during 3 hours in nitrogen atmosphere and futher 47 parts of diethylamine and 67 parts of diethanol amine were dropped in at 60° C. of temperature during 30 minutes.

The reaction was carried out at 80° C. of temperature during 2 hours and thus, an amination reaction material was obtained. 1,344 parts of the said amination reaction material were added in 588 parts of the pertial block isocyanate (1-B), i.e. the same partial block isocyanate obtained in Example 1 and the resulting mixture was thermally treated at 80° C. of temperature during 1.5 hours. Further, it was diluted with butyl cellosolve to 70 percent of NV and thus, the resin composition by the present invention (R-2) having an amine value of 47 was obtained.

EXAMPLE 3

A solution which consists of 300 parts of the carboxyl terminated polybutadiene (PBC-1000) i.e. the same polybutadiene used in Example 1, 700 parts the epoxy resin, i.e. Epikote-1001 (Trade Name for the product of Shell Chemical Co.,), 200 parts of cellosolve acetate, 150 parts of methyl isobutyl ketone and 2.0 parts of triethanol amine as a catalyst was heated at 140° C. of temperature during 4 hours in nitrogen atmosphere.

Then, 82 parts of diethylamine was dropped in it at 60° C. of temperature during 30 minutes and further, the reaction was performed at 80° C. of temperature during 2 hours and thereby, the amination reaction compound was obtained.

1,432 parts of the amination reaction compound were blended in 728 parts of the partial block isocyanate (1-B), i.e. the same partial block isocyanate obtained in Example 1 and the resulting mixture was heated at 80° C. of temperature during 1.5 hours and it was diluted with butyl cellosolve to 70 percent of NV.

Thus, the resin composition by the present invention (R-3) having an amine value of 40 was obtained.

EXAMPLE 4

500 parts of the carboxyl terminated polybutadiene (Trade Name: NISSO-PBC-2000) having 1950 of molecular weight, a micro struture of 91.0 percent of 1,2-vinyl bond and 9.0 percent of 1,4-trans bond and 49 of acid value, i.e. the same butadiene polymer produced with the same process in Example 1, 500 parts of Epikote-834 and 300 parts of cellosolve acetate at 150° C. of temperature during 3 hours in nitrogen atmosphere. Then, 92 parts of diethylamine was dropped in above resulting mixture at 60° C. of temperature during 30 minutes and further, its reaction was performed at 80° C. of temperature during 30 minutes and thereby, the amination reaction compound was obtained. By the same process as in Example 1, 585 parts of tolylene diisocyanate, 117 parts of cellosolve acetate and 211 parts of hydroxy methyl-methacrylate were added in 1,392 parts of the said parts of 2-hydroxy ethyl-methacrylate were added in 1,392 parts of the said amination reaction compound and the reaction was performed at 80° C. of temperature during 2 hours. Further, the resulting reaction compound was diluted with butyl cellosolve to 70 percent of NV and thus, the resin composition by the present invention (R-4) having 46 of amine value was obtained.

EXAMPLE 5

500 parts of carboxyl terminated polybutadiene (Trade Name: NISSO-PBC-3000, product of Nippon Soda Co., Ltd) having 3.020 of molecular weight, a micro structure of 91.5 percent of 1,2-vinyl bond and 8.5 percent of 1,4-trans bond and 32 of acid value, 500 parts of Epikote-834, 100 parts of methyl isobutyl ketone and 150 parts of cellosolve acetate were heated at 150° C. of temperature during 3 hours in nitrogen atmosphere. Then, 148 parts of diethanol amine were dropped in the resulting mixture at 80° C. of temperature during 30 minutes and the reaction was carried out at 80° C. of temperature during 2 hours and thus, the amination reaction compound was obtained.

360 parts of the partial block isocyanate (1-B), i.e. the same partial block isocyanate used in Example 1 was added in 1,398 parts of the said amination reaction compound and the reaction was carried out at 80° C. of temperature during one hour. Further, the resulting reaction compound was diluted with butyl cellosolve to 70 percent of NV and thereby, the resin compound by the present invention (R-5) having 52 of amine value was obtained.

EXAMPLE 6

A sodium dispersed material was added in tetrahydrofuran containing dissolved 1,2-diphenyl benzene and a monomer mixture consisting of 70 percent of butadiene and 30 percent of styrene was added in above resulting solution at −60° C. of temperature and thereby, the living polymerization reaction solution was produced and it was treated with carbon dioxide. Thus, carboxyl terminated butadiene-styrene copolymer having 1520 of molecular weight, a micro butadiene element structure of 89.0 percent 1,2-vinyl bond and 11.0 percent of 1,4-trans bond, 62 of acid value and a ratio of butadiene unit/styrene unit as 70/30 of rate was produced. Then, 500 parts of the said copolymer, 500 parts of Epikote-834 and 300 parts of cellosolve acetate were heated at 140° C. of temperature during 4 hours in the nitrogen atmosphere and further, 121 parts of diethanolamine was added in the resulting mixture at 80° C. of temperature during 30 minutes. Then, its reaction was carried out at 80° C. of temperature during 2 hours and thereby, the amination reaction compound was obtained.

466 parts of the partial block isocyanate (4-B), i.e. the same partial block isocyanate used in Example 4 was added in 1,421 parts of the said amination reaction compound and its reaction carried out at 80° C. of temperature during 1.5 hours.

The resulting reaction compound was diluted with butyl cellosolve to 70 percent of NV and thereby, the resin composition by the present invention (R-6) having an amine value of 44 was obtained.

EXAMPLE 7

A carboxyl terminated butadiene-styrene copolymer havin 2,050 of molecular weight, a micro butadiene element structure of 87.5 percent of 1,2-vinyl bond and 12.5 percent of 1,4-trans bond, 45 of acid, value and a ratio of butadiene unit/styrene unit as 50/50 of rate was produced in compliance with the same process in Example 6.

400 parts of the said copolymer, 600 parts of Epikote-1001, 250 parts of cellosolve acetate and 100 parts of methyl-isobutyl ketone were heated at 140° C. of temperature during 4 hours. Then, 45 parts of diethylamine was added in the resulting mixture at 60° C. of temperature during 30 minutes and then, 16 parts of ethylenediamine was added in it at 60° C. of temperature during 30 minutes and the reaction was performed at 80° C. of temperature during 2 hours and thus, the amination reaction compound was obtained.

510 parts of the partial block isocyanate, i.e. the same material used in Example 1 were added in 1,411 parts of the said amination reaction compound and its reaction was carried out at 80° C. of temperature during 2 hours. The resulting reaction compound was diluted with butyl cellosolve to 70 percent of NV and thereby, the resin composition by the present invention (R-7) having 40 of amine value was obtained.

Comparative Example 1

A mixture consisting of 500 parts of the Epikote-1001 and 143 parts of methyl-isobutyl ketone was kept at 60° C. of temperature and 73 parts of diethylamine was dropped in it in the course of 30 minutes and further, its reaction was performed during 2 hours and thus, an adduct of expoxy resinamine was obtained. Then, 478 parts of the partial block isocyanate (1-B), i.e. the same material used in Example 1 was added in the said adduct of expoxy resin-amine and its reaction was carried out at 80° C. of temperature during one hour and the resulting reaction compound was diluted with butyl cellosolve to 70 percent of NV. Thus, a resin composition (CR-1) having 53 of amine number for the cationic electrodeposition use which is free from a polybasic acid compound element having unsaturated group was obtained as a comparative example used for the present invention.

Comparative Example 2

280 parts of carboxyl terminated polybutadiene (PBC-1000) i.e. the same butadiene polymer used in Example 1 was made to react with 260 parts of Epikote-154 (Trade Name for product of Shell Chemical Co.), i.e. novolak type of epoxy resin and 150 parts of cellusolve acetate at 155° C. of temperature during 2.5 hours in the nitrogen atmosphere. The resulting reaction compound was cooled to 70° C. of temperature and then, a mixture consisting of 50.0 parts of diethanol amine and 10.0 parts cellosolve acetate was gradually added in it.

The reaction was carried out at 90° C. of temperature during 2 hours and the resulting reaction compound was diluted with butyl cellosolve to 70 percent of NV. Thus the resin composition (CR-2) for the cationic electrodeposition use having an amine value of 43 which comprises the use of a novolak type of epoxy resin and being free from the block isocyanate element and the curing catalyst was obtained as the comparative example to the present invention.

Experimental Example 228 parts of the resin compositions obtained from foregoing Examples and Comparative Examples were sampled and 1.0 parts of oleo-soluble manganese naphthenate having 5 percent of concentration and 1.6 parts of dibutyl-tin-dilaurate are respectively added in those sampled resin compositions and the resulting resin compositions were satisfactorily mixed and then neutralized with acetic acid to a PH extent of 5.6 to 6.0.

Further, 40.0 parts of titanium white, 0.4 parts of carbon black and an appropriate amount of deionized water are respectively added in the resulting resin compositions and resulting aqueous mixtures of the resin compositions were respectively treated with a dispersing step in bail mills. Furthermore, the resulting materials were respectively diluted with deionized waters so that the total amounts were 2,000 parts of volume. Thus, the samples having 10 percent of NV for the electrodeposition coating test were prepared.

The electrodeposition coating test was respectively applied to those samples and various test results for the electrodepositting coating tests and the various film properties testing methods are set forth in Table-1.

As shown in the Table-1, the films obtained by the cationic electrodepositting type of paint compositions by the present invention, in comparison with the films otained from the comparison components in comparative Examples indicate manifestly superior properties as to the bath stability, the film curing effect, the external appearance of coated surface, the anticorrosive nature and other physical properties.

TABLE 1

| Paint | | R-1 | R-2 | R-3 | R-4 | R-5 | R-6 | R-7 | CR-1 | CR-2 |
|---|---|---|---|---|---|---|---|---|---|---|
| PH of bath composition (1) | | 5.90 | 5.70 | 5.90 | 5.80 | 5.85 | 5.90 | 5.75 | 5.50 | 5.75 |
| Specific electrical resistivity of bath (1) | ($\Omega$-cm) | 960 | 1100 | 1250 | 1050 | 1000 | 1200 | 1350 | 960 | 1050 |
| Pigment dispersibility (2) | | O | O | O | O | O | O | O | × | $\Delta$ |
| Voltage (3) | (Volt) | 160 | 180 | 190 | 200 | 220 | 170 | 180 | 160 | 140 |
| Curing conditions | | | | | | | | | | |
| temperature | (°C.) | 180 | 180 | 180 | 180 | 180 | 185 | 185 | 190 | 200 |
| time | (minutes) | 30 | 30 | 30 | 30 | 30 | 30 | 30 | 30 | 30 |
| Film Properties | | | | | | | | | | |
| film thickness | ($\mu$) | 22 | 20 | 22 | 20 | 20 | 20 | 20 | 20 | 20 |
| smoothness of surface (4) | | O | O | O | O | O | O | O | $\Delta$ | O |
| pencil hardness | | | | | | | | | | |
| impact resistance (5) | surface (cm) | 50 | 50 | 50 | 50 | 50 | 50 | 50 | 40 | 50 |
| | back (cm) | 50 | 50 | 50 | 50 | 50 | 50 | 50 | 20 | 50 |
| bending resistance (6) | (mm$\phi$) | 2 | 2 | 2 | 2 | 3 | 2 | 3 | 6 | 3 |
| corrosion resistance (7) | (hrs) | 500 | 550 | 500 | 650 | 550 | 550 | 500 | 450 | 350 |
| Storage stability (8) | | | | | | | | | | |
| film thickness | ($\mu$) | 20 | 19 | 18 | 18 | 16 | 18 | 17 | 8 | 16 |
| surface appearance | | O | O | O | O | O | O | O | × | $\Delta$ |

Remarks
(1) measured at 30° C.
(2) precipitated phase status of bottom was observed after standing each paint composition (NV = 10%) in sealed test tube 18 mm$\phi$ at 40° C. for one week.
O: soft caking, easily redispersible
$\Delta$: soft caking, slightly difficult in redispersion
×: hard caking, difficult in redispersion
(3) Voltage to obtain 20 ± 2$\mu$ of film thickness on iron phosphated panel when electrodeposition is carried out at 30° C. for 2 minutes.
(4) smoothness of surface was observed with the unaided eye.
O: good
$\Delta$: slightly bad
×: bad (orange peeling)
(5) Hight was shown when tested in accordance with JIS-K-4000, loaded 1 kg × ½ inch, and no failure was observed.
(6) Cylindrical diameter was shown when tested by JIS-K-5400, and no failure was observed.
(7) Required hours was shown when tested in accordance with JIS-Z-2371, and peeling corrosion reached to 3 mm width of one side on iron phosphated panel.
(8) Each paint composition (NV = 10%) was stored under open stirring and supplying deinoized water equal to volatiled loss at 35° C. for one month. Then, film thickness and film appearances was tested under the same electrodeposition condition as (3).

What is claimed is:

1. A paint composition for cationic electrodeposition in the form of an aqueous solution or dispersion, essentially prepared by:
   (a) reacting a carboxyl terminated polymer of a conjugated diene or a carboxyl terminated copolymer of a conjugated diene and vinyl monomer with a bisphenol A-epichlorohydrin epoxy resin condensate, in an amount of at least one equivalent part of the epoxy group of the latter in proportion to one equivalent part of the carboxyl group of the former at a temperature of about 80° C. to about 200° C. until the carboxyl group may be substantially eliminated to produce a reaction intermediate;
   (b) reacting said intermediate with a primary amine or a secondary amine compound, in an amount of not more than one equivalent part of said amine compound in proportion to one equivalent part of the epoxy group of said intermediate at a temperature of about 50° C. to about 150° C. to obtain an epoxy-amine adduct first component having an amine value of 20 to 200;

(c) reacting said first component with a partial block isocyanate compound as a second component, the ratio of said first and second components being selected as 99 to 55 percent by weight of the former to 1 to 50 percent by weight of the latter component; and, (d) neutralizing the resultant resin with an acid to render the resultant resin soluble or dispersible in water.

* * * * *

UNITED STATES PATENT AND TRADEMARK OFFICE
CERTIFICATE OF CORRECTION

PATENT NO. : 4,251,415

DATED : February 17, 1981

INVENTOR(S) : Hisao Nakada et al.

It is certified that error appears in the above—identified patent and that said Letters Patent is hereby corrected as shown below:

On the title page, the assignee should read as follows:

-- Nippon Soda Co., Ltd., Tokyo, Japan and
Kansai Paint Co., Ltd., Hyogo-ken, Japan --.

Signed and Sealed this

Second Day of June 1981

[SEAL]

Attest:

RENE D. TEGTMEYER

Attesting Officer

Acting Commissioner of Patents and Trademarks